(12) United States Patent
Kasada

(10) Patent No.: US 10,891,982 B2
(45) Date of Patent: *Jan. 12, 2021

(54) MAGNETIC TAPE HAVING SERVO PATTERN AND CHARACTERIZED MAGNETIC LAYER, AND MAGNETIC TAPE DEVICE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,331

(22) Filed: Apr. 14, 2020

(65) Prior Publication Data

US 2020/0243110 A1 Jul. 30, 2020

Related U.S. Application Data

(63) Continuation of application No. 16/361,570, filed on Mar. 22, 2019, now Pat. No. 10,672,426.

(30) Foreign Application Priority Data

Mar. 23, 2018 (JP) .................................. 2018-056513
Mar. 18, 2019 (JP) .................................. 2019-050170

(51) Int. Cl.
*G11B 5/78* (2006.01)
*G11B 5/706* (2006.01)
(Continued)

(52) U.S. Cl.
CPC ............... *G11B 5/706* (2013.01); *G11B 5/70* (2013.01); *G11B 5/702* (2013.01); *G11B 5/735* (2013.01); *G11B 5/78* (2013.01)

(58) Field of Classification Search
None
See application file for complete search history.

(56) References Cited

U.S. PATENT DOCUMENTS 4,731,292 A 3/1988 Sasaki et al.
4,818,606 A 4/1989 Koyama et al.
(Continued)

FOREIGN PATENT DOCUMENTS

EP 0 421 213 A2 4/1991
JP 2-168415 A 6/1990
(Continued)

OTHER PUBLICATIONS

Communication dated Mar. 3, 2020 by the Japanese Patent Office in Japanese application No. 2017-123062.
(Continued)

*Primary Examiner* — Craig A. Renner
(74) *Attorney, Agent, or Firm* — Sughrue Mion, PLLC

(57) ABSTRACT

The magnetic tape includes a non-magnetic support; and a magnetic layer including a ferromagnetic powder and a binding agent on the non-magnetic support, in which a magnetic tape total thickness is equal to or smaller than 5.30 μm, the magnetic layer has a servo pattern, a center line average surface roughness Ra measured regarding a surface of the magnetic layer is equal to or smaller than 1.8 nm, and an isoelectric point of a surface zeta potential of the magnetic layer is equal to or greater than 5.5.

8 Claims, 2 Drawing Sheets

(51) Int. Cl.
*G11B 5/702* (2006.01)
*G11B 5/735* (2006.01)
*G11B 5/70* (2006.01)

(56) References Cited

U.S. PATENT DOCUMENTS

| | | |
|---|---|---|
| 5,689,384 A | 11/1997 | Albrecht et al. |
| 7,755,863 B2 | 7/2010 | Neumann et al. |
| 9,773,519 B2 | 9/2017 | Kasada et al. |
| 10,672,426 B2 * | 6/2020 | Kasada ................. G11B 5/706 |
| 2005/0153170 A1 | 7/2005 | Inoue et al. |
| 2012/0003503 A1 | 1/2012 | Mori |
| 2012/0244387 A1 | 9/2012 | Mori et al. |
| 2015/0380036 A1 | 12/2015 | Kasada et al. |
| 2016/0093322 A1 | 3/2016 | Kasada et al. |
| 2016/0171993 A1 | 6/2016 | Okubo |
| 2016/0189739 A1 | 6/2016 | Kasada et al. |
| 2017/0186460 A1 | 6/2017 | Kasada et al. |
| 2018/0374504 A1 | 12/2018 | Kasada |
| 2019/0295586 A1 | 9/2019 | Kasada |
| 2019/0295588 A1 | 9/2019 | Kasada |
| 2019/0295589 A1 | 9/2019 | Kasada |
| 2020/0126589 A1 * | 4/2020 | Iwamoto et al. ...... G11B 5/706 |
| 2020/0211593 A1 | 7/2020 | Kasada |
| 2020/0251139 A1 | 8/2020 | Kasada et al. |

FOREIGN PATENT DOCUMENTS

| | | |
|---|---|---|
| JP | 9-190623 A | 7/1997 |
| JP | 2002-8910 A | 1/2002 |
| JP | 2005-243162 A | 9/2005 |
| JP | 2006-54018 A | 2/2006 |
| JP | 2011-134372 A | 7/2011 |
| JP | 2012-203956 A | 10/2012 |
| JP | 2016-110680 A | 6/2016 |

OTHER PUBLICATIONS

Office Action issued in U.S. Appl. No. 16/361,570 dated Sep. 27, 2019; 16 pages.
Office Action dated Sep. 2, 2020 in U.S. Appl. No. 16/361,814.
Office Action dated Aug. 18, 2020 in U.S. Appl. No. 16/361,797.
Office Action dated Jun. 16, 2020 in U.S. Appl. No. 16/777,201.
Notice of Allowance dated Oct. 1, 2020 in U.S. Appl. No. 16/777,201.
Notice of Allowance dated Dec. 2, 2020 in U.S. Appl. No. 16/361,797.

* cited by examiner

MAGNETIC TAPE HAVING SERVO PATTERN AND CHARACTERIZED MAGNETIC LAYER, AND MAGNETIC TAPE DEVICE

CROSS-REFERENCE TO RELATED APPLICATIONS

This application is a Continuation Application of application Ser. No. 16/361,570 filed Mar. 22, 2019, which claims priority under 35 U.S.C 119 to Japanese Patent Application No. 2018-056513 filed on Mar. 23, 2018 and Japanese Patent Application No. 2019-050170 filed on Mar. 18, 2019. Each of the above applications is hereby expressly incorporated by reference, in its entirety, into the present application.

BACKGROUND OF THE INVENTION

1. Field of the Invention

The present invention relates to a magnetic tape and a magnetic tape device.

2. Description of the Related Art

Magnetic recording media are divided into tape-shaped magnetic recording media and disk-shaped magnetic recording media, and tape-shaped magnetic recording media, that is, magnetic tapes (hereinafter, also simply referred to as "tapes") are mainly used for data storage such as data back-up or archive. The recording of information on a magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technology of disposing a larger amount of data tracks in a width direction of the magnetic tape by narrowing the width of the data track to increase recording density is used.

However, in a case where the width of the data track is narrowed and the recording and/or reproduction of information is performed by allowing the running of the magnetic tape in a magnetic tape device (normally referred to as a "drive"), it is difficult for a magnetic head to correctly follow the data tracks due to the position change of the magnetic tape, and errors may easily occur at the time of recording and/or reproduction. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo signal (servo pattern) is formed in a magnetic layer of a magnetic tape, and this servo pattern is magnetically read to perform head tracking. More specific description is as follows.

First, a servo head reads a servo pattern formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head in the width direction of the magnetic tape in the magnetic tape device, by performing the head tracking servo. By doing so, it is possible to correctly record information on the magnetic tape and/or correctly reproduce information recorded on the magnetic tape in the magnetic tape device.

Meanwhile, the magnetic tape is normally used to be accommodated and circulated in a magnetic tape cartridge. In order to increase recording capacity for one reel of the magnetic tape cartridge, it is desired to increase a total length of the magnetic tape accommodated in one reel of the magnetic tape cartridge. In order to increase the total length of the magnetic tape, it is necessary that the magnetic tape is thinned (hereinafter, referred to as "thinning").

In addition, in recent years, it is necessary that surface smoothness of a magnetic layer is increased in a magnetic tape. This is because an increase in surface smoothness of a magnetic layer allows for improvement of electromagnetic conversion characteristics.

In consideration of these circumstances, the inventors have studied the application of a magnetic tape having a decreased total thickness and increased surface smoothness of a magnetic layer to a servo system. However, in such studies, it was clear that, a phenomenon which was not known in the related art occurred, in which a generation frequency of a signal defect during servo signal reproduction in a servo system increases, in a case where a total thickness of the magnetic tape is decreased and surface smoothness of a magnetic layer is increased. An example of such a signal defect is a signal defect called thermal asperity. The thermal asperity is a fluctuation of a reproduced waveform occurred due to a change in resistance value of a magnetoresistive (MR) element caused by occurrence of a local temperature change in the MR element, in a system including an MR head in which the MR element is mounted. In a case where a signal defect is generated during servo signal reproduction, it is difficult to perform head tracking at the portion where the signal defect is generated. Accordingly, it is necessary to decrease the generation frequency of a signal defect during servo signal reproduction, in order to more correctly record information on the magnetic tape and/or more correctly reproduce information recorded on the magnetic tape by using the servo system.

Therefore, an object of the invention is to decrease a generation frequency of a signal defect in a servo system, in a magnetic tape having a decreased total thickness and increased surface smoothness of a magnetic layer.

According to one aspect of the invention, there is provided a magnetic tape comprising: a non-magnetic support; and a magnetic layer including a ferromagnetic powder and a binding agent on the non-magnetic support, in which a magnetic tape total thickness is equal to or smaller than 5.30 μm, the magnetic layer has a servo pattern, a center line average surface roughness Ra measured regarding a surface of the magnetic layer (hereinafter, also referred to as a "magnetic layer surface roughness Ra") is equal to or smaller than 1.8 nm, and an isoelectric point of a surface zeta potential of the magnetic layer is equal to or greater than 5.5.

In one aspect, the isoelectric point may be 5.5 to 7.0.

In one aspect, the binding agent may be a binding agent including an acidic group.

In one aspect, the acidic group may include at least one kind of acidic group selected from the group consisting of a sulfonic acid group and a salt thereof.

In one aspect, the center line average surface roughness Ra measured regarding the surface of the magnetic layer may be 1.2 nm to 1.8 nm.

In one aspect, the magnetic tape total thickness may be 3.00 µm to 5.30 µm.

In one aspect, the magnetic tape may further comprise a non-magnetic layer including a non-magnetic powder and a binding agent between the non-magnetic support and the magnetic layer.

In one aspect, the magnetic tape may further comprise a back coating layer including a non-magnetic powder and a binding agent on a surface of the non-magnetic support opposite to a surface provided with the magnetic layer.

According to another aspect of the invention, there is provided a magnetic tape device comprising: the magnetic tape; a magnetic head; and a servo head.

In the specification, a "servo write head", a "servo head", and a "magnetic head" are disclosed as a head. The servo write head is a head which performs recording of a servo signal (that is, formation of a servo pattern). The servo head is a head which performs reproducing of a servo signal (that is, reading of a servo pattern), and a magnetic head is a head which performs recording and/or reproducing of information.

According to one aspect of the invention, it is possible to provide a magnetic tape that is thinned and has a servo pattern in a magnetic layer having high surface smoothness, a magnetic tape in which a generation frequency of a signal defect during servo signal reproduction in a servo system is decreased, and a magnetic tape device which records a magnetic signal on this magnetic tape and/or reproduces the magnetic signal.

DESCRIPTION OF THE PREFERRED EMBODIMENTS

Magnetic Tape

Figure 1:
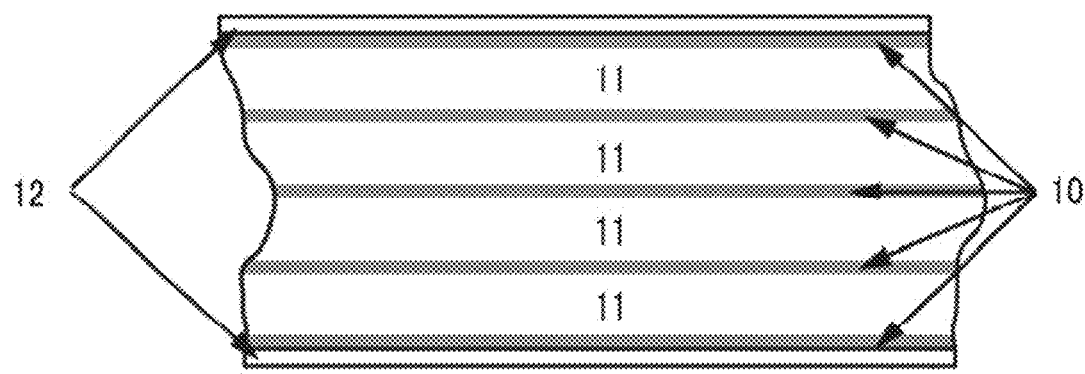
FIG. 1 shows an example of disposition of data bands and servo bands.

A magnetic tape according to one aspect of the invention relates to a magnetic tape including: a non-magnetic support; and a magnetic layer including a ferromagnetic powder and a binding agent on the non-magnetic support, in which a magnetic tape total thickness is equal to or smaller than 5.30 µm, the magnetic layer has a servo pattern, a center line average surface roughness Ra measured regarding a surface of the magnetic layer is equal to or smaller than 1.8 nm, and an isoelectric point of a surface zeta potential of the magnetic layer is equal to or greater than 5.5.

Hereinafter, the magnetic tape will be described more specifically. The following description includes a surmise of the inventors. The invention is not limited to such a surmise. In addition, hereinafter, exemplary description may be made with reference to the drawings. However, the invention is not limited to the exemplified aspects.

Magnetic Layer

Magnetic Layer Surface Roughness Ra

The center line average surface roughness Ra measured regarding the surface of the magnetic layer of the magnetic tape (magnetic layer surface roughness Ra) is equal to or smaller than 1.8 nm. In the magnetic tape in which the magnetic layer surface roughness Ra is equal to or smaller than 1.8 nm and the total thickness is equal to or smaller than 5.30 µm, a generation frequency of a signal defect during servo signal reproduction increases in a servo system, in a case where any measures are not prepared. With respect to this, in the magnetic tape in which the isoelectric point of the surface zeta potential of the magnetic layer is equal to or greater than 5.5, it is possible to prevent generation of a signal defect during the servo signal reproduction, even in a case where the magnetic layer surface roughness Ra is equal to or smaller than 1.8 nm and the total thickness is equal to or smaller than 5.30 µm. A surmise of the inventors regarding this point will be described later. In addition, the magnetic tape having the magnetic layer surface roughness Ra equal to or smaller than 1.8 nm can exhibit excellent electromagnetic conversion characteristics. From a viewpoint of further improving electromagnetic conversion characteristics, the magnetic layer surface roughness Ra is preferably equal to or smaller than 1.7 nm and more preferably equal to or smaller than 1.6 nm. In addition, the magnetic layer surface roughness Ra can be, for example, equal to or greater than 1.2 nm or equal to or greater than 1.3 nm. However, low magnetic layer surface roughness Ra is preferable, from a viewpoint of improving electromagnetic conversion characteristics, and thus, the magnetic layer surface roughness Ra may be lower than the value exemplified above. In the invention and the specification, the "surface of the magnetic layer" of the magnetic tape is identical to the surface of the magnetic tape on the magnetic layer side.

The center line average surface roughness Ra measured regarding the surface of the magnetic layer of the magnetic tape according to one aspect of the invention and the specification is a value measured with an atomic force microscope (AFM) in a region having an area of 40 µm×40 µm of the surface of the magnetic layer. As an example of the measurement conditions, the following measurement conditions can be used. The magnetic layer surface roughness Ra shown in examples which will be described later is a value obtained by the measurement under the following measurement conditions.

The measurement is performed regarding the region of 40 µm×40 µm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 µm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer (for example, ferromagnetic powder, non-magnetic powder which can be randomly included, and the like) or manufacturing conditions of the magnetic tape. Thus, by adjusting these, it is possible to obtain the magnetic tape having the magnetic layer surface roughness Ra equal to or smaller than 1.8 nm.

Servo Pattern

The magnetic tape has a servo pattern in the magnetic layer. The formation of the servo pattern on the magnetic layer is performed by magnetizing a specific position of the magnetic layer by a servo write head. A shape of the servo pattern and disposition thereof in the magnetic layer for realizing the head tracking servo are well known. In regards to the servo pattern of the magnetic layer of the magnetic tape, a well-known technology can be used. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed on a magnetic layer, and a position of a servo head is recognized by an interval of time in a case where the servo head has read two servo patterns having different shapes and an interval of time in a case where the servo head has read two servo patterns having the same shapes. The position of the magnetic head in the width direction of the magnetic tape is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
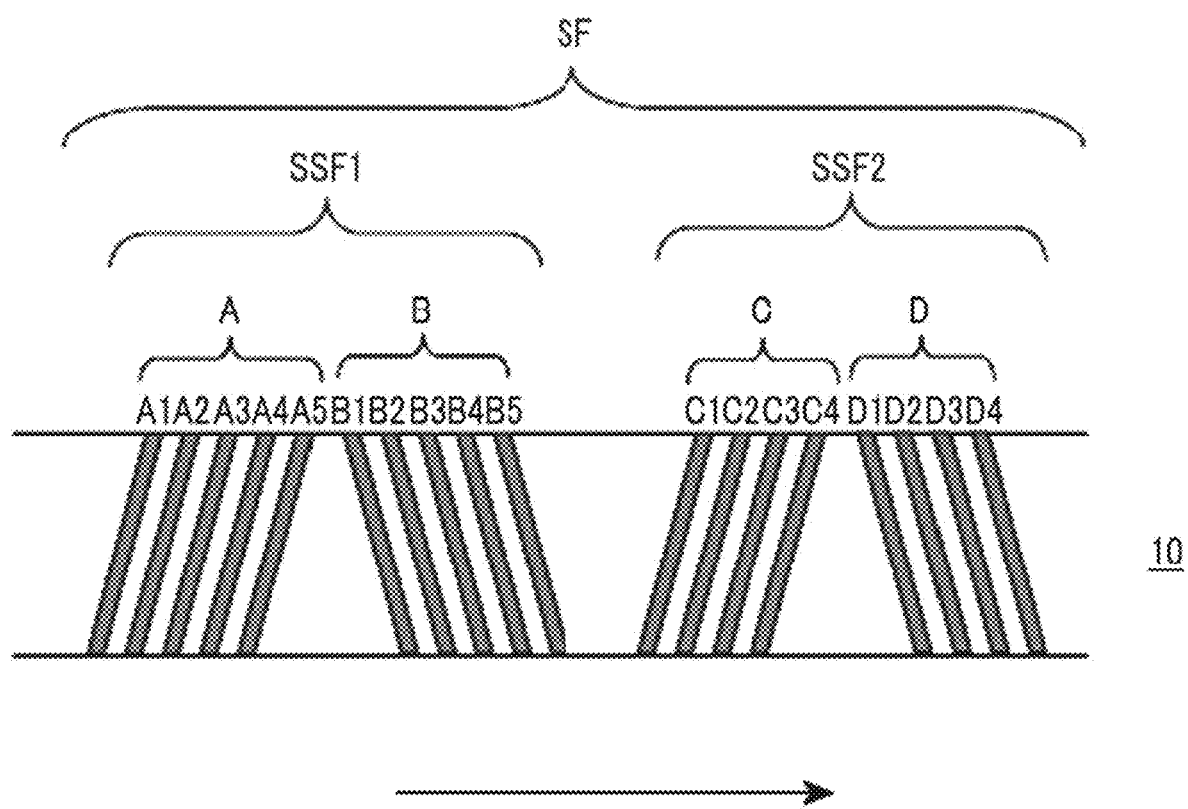
FIG. 2 shows a servo pattern disposition example of a linear-tape-open (LTO) Ultrium format tape.
Figure 3:
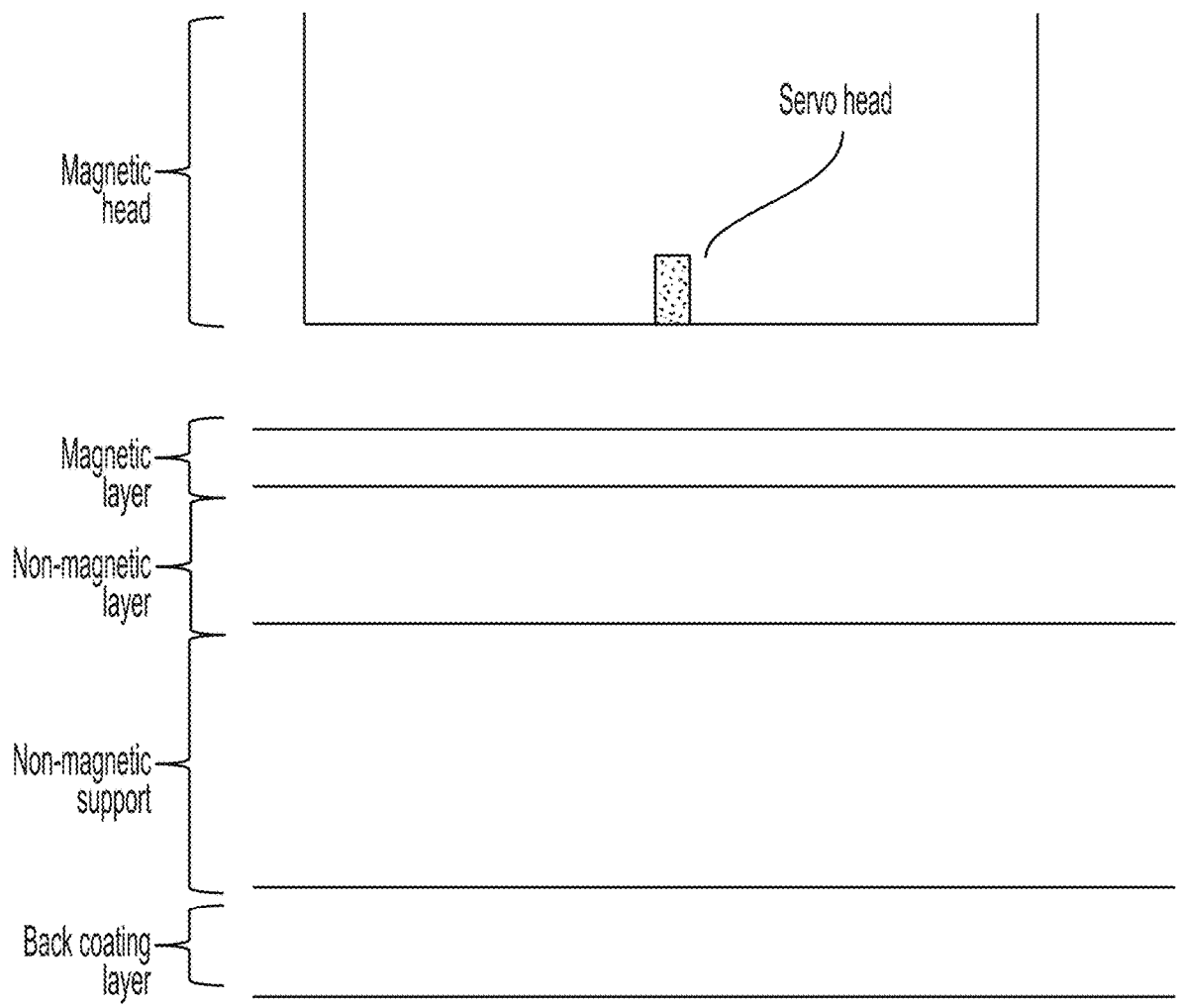
FIG. 3 is a schematic illustration of a magnetic tape device having a magnetic head and a servo head, as well as a magnetic tape having a non-magnetic support, a magnetic layer including a ferromagnetic powder and a binding agent on the non-magnetic support, a non-magnetic layer between the non-magnetic support and the magnetic layer, and a back coating layer on the surface of the non-magnetic support opposite to the surface provided with the magnetic layer.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The interval of time is normally obtained as an interval of time of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of time in a case where the two servo patterns having different shapes are read by the servo head is, for example, an interval between the time in a case where any servo pattern of the A burst is read and the time in a case where any servo pattern of the B burst is read. An interval of time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the interval of time is due to a position change of the magnetic tape in the width direction, in a case where the interval of time is deviated from the set value. The set value is an interval of time in a case where the magnetic tape runs without occurring the position change in the width direction. In the timing-based servo system, the magnetic head is moved in the width direction in accordance with a degree of the deviation of the obtained interval of time from the set value. Specifically, as the interval of time is greatly deviated from the set value, the magnetic head is greatly moved in the width direction. This point is applied to not only the aspect shown in FIGS. 1 and 2, but also to entire timing-based servo systems.

In the magnetic tape device using the timing-based servo system, for example, in a case where a signal defect is generated during servo signal reproduction, it is difficult to obtain a measurement result of an interval of time at a portion where the defect is generated (servo frame). As a result, in a case of causing the magnetic tape to run to perform recording or reproducing of a magnetic signal (information) by a magnetic head, it is partially difficult to perform positioning of a head by moving the magnetic head in a width direction. This is not limited to the timing-based servo system, and in a case where a signal defect is generated during the servo signal reproduction in a magnetic tape device using a servo system, it is partially difficult to perform positioning of a head by moving the magnetic head, in a case of causing the magnetic tape to run to perform recording or reproducing of a magnetic signal (information) by a magnetic head.

In regards to the point described above, in the studies of the inventors, it is determined that, in the magnetic tape having the total thickness equal to or smaller than 5.30 μm and the magnetic layer surface roughness Ra equal to or smaller than 1.8 nm, a signal defect is significantly generated during the servo signal reproduction. The inventors have thought that a reason of generation of a signal defect during the servo signal reproduction is prevention of smooth sliding of the servo head and the surface of the magnetic layer (hereinafter, a deterioration in sliding properties). The inventors have surmised that different contact states of the servo head and the surface of the magnetic layer between the magnetic tape having the total thickness equal to or smaller than 5.30 μm and the magnetic layer surface roughness Ra equal to or smaller than 1.8 nm, and a magnetic tape of the related art, may be due to a decrease in sliding properties. However, this is merely a surmise.

With respect to this, as a result of intensive studies of the inventors, it is clear that the generation of a signal defect during the servo signal reproduction can be prevented by setting the isoelectric point of the surface zeta potential of the magnetic layer to be equal to or greater than 5.5. A surmise of the inventors regarding this point will be described later.

Isoelectric Point of Surface Zeta Potential of Magnetic Layer

In the magnetic tape, the isoelectric point of the surface zeta potential of the magnetic layer is equal to or greater than 5.5. In the invention and the specification, the isoelectric point of the surface zeta potential of the magnetic layer is a value of pH, in a case where a surface zeta potential of the magnetic layer measured by a flow potential method (also referred to as a flow current method) becomes zero. A sample is cut out from the magnetic tape which is a measurement target, and the sample is disposed in a measurement cell so that the surface of the magnetic layer which is a target surface for obtaining the surface zeta potential comes into contact with an electrolyte. Pressure in the measurement cell is changed to flow the electrolyte and a flow potential at each pressure is measured, and then, the surface zeta potential is obtained by the following calculation expression.

$$\zeta = \frac{dI}{dp} \times \frac{\eta}{\varepsilon \varepsilon_0} \frac{L}{A}$$ (Calculation Expression)

[$\zeta$: surface zeta potential, p: pressure, I: flow potential, $\eta$: viscosity of electrolyte, $\varepsilon$: relative dielectric constant, $\varepsilon_0$: dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed by using electrolytes having different pH (from pH of 9 to pH of 3 at interval of approximately 0.5). A total number of measurement points is 13 from the measurement point of pH 9 to the 13th measurement points of pH 3. By doing so, the surface zeta potentials of each measurement point of pH is obtained. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, pH, in a case where the surface zeta potential is zero, is obtained by interpolation by using a straight line (linear function) showing a relationship between the surface zeta potential and pH of each of the two measurement points. Meanwhile, in a case where all of the surface zeta potentials obtained during the decrease of pH from 9 to 3 is positive value, pH, in a case where the surface zeta potential is zero, is obtained by extrapolation by using a straight line (linear function) showing a relationship between the surface zeta potential and pH of the 13th measurement point (pH of 3) which is the final measurement point and the 12th measurement point. On the other hand, in a case where all of the surface zeta potentials obtained during the decrease of pH from 9 to 3 is negative value, pH, in a case where the surface zeta potential is zero, is obtained by extrapolation by using a straight line (linear function) showing a relationship between the surface zeta potential and pH of the first measurement point (pH of 9) which is the initial measurement point and the 12th measurement point. By doing so, the value of pH, in a case where the surface zeta potential of the magnetic layer measured by the flow potential method is zero, is obtained.

The above measurement is performed three times in total at room temperature by using different samples cut out from the same magnetic tape (magnetic tape which is a measurement target), and pH, in a case where the surface zeta potential of each sample is zero, is obtained. For the viscosity and the relative dielectric constant of the electrolyte, a measurement value at room temperature is used. The room temperature is set as 20° C. to 27° C. An arithmetical mean of three pHs obtained as described above is an isoelectric point of the surface zeta potential of the magnetic layer of the magnetic tape which is a measurement target. In addition, as the electrolyte having pH of 9, an electrolyte obtained by adjusting pH of a KCl aqueous solution having a concentration of 1 mmol/L to 9 by using a KOH aqueous solution having a concentration of 0.1 mol/L is used. As the electrolyte having other pH, an electrolyte obtained by adjusting pH of the electrolyte having pH of 9, which is adjusted as described above, by using an HCl aqueous solution having a concentration of 0.1 mol/L is used.

The isoelectric point of the surface zeta potential measured by the method described above is an isoelectric point obtained regarding the surface of the magnetic layer. As a result of the intensive studies, the inventors have newly found that, by setting the isoelectric point of the surface zeta potential of the magnetic layer to be equal to or greater than 5.5, it is possible to prevent occurrence of a signal defect during the servo signal reproduction in a magnetic tape having a total thickness equal to or smaller than 5.30 μm and the magnetic layer surface roughness Ra equal to or smaller than 1.8 nm. As a reason thereof, the inventors have surmised that, in a magnetic tape in which an isoelectric point of a surface zeta potential of a magnetic layer is in a neutral to basic pH region, the surface of the magnetic layer and a servo head hardly react with each other electrochemically, and this contributes to prevention of a deterioration in sliding properties between the servo head and the surface of the magnetic layer. However, it is merely a surmise. Thus, the invention is not limited to the above surmise.

As will be described later in detail, the isoelectric point of the surface zeta potential of the magnetic layer can be controlled by the kind of a component used for forming the magnetic layer, a formation step of the magnetic layer, and the like. From a viewpoint of ease of controlling, the isoelectric point of the surface zeta potential of the magnetic layer is preferably equal to or smaller than 7.0, more preferably equal to or smaller than 6.7, and even more preferably equal to or smaller than 6.5. In addition, the isoelectric point of the surface zeta potential of the magnetic layer is equal to or greater than 5.5, preferably equal to or greater than 5.7, and more preferably equal to or greater than 6.0.

Next, the magnetic layer will be described more specifically.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used as the ferromagnetic powder. Meanwhile, the average particle size of the ferromagnetic powder is preferably equal to or greater than 5 nm, and more preferably equal to or greater than 10 nm, from a viewpoint of stability of magnetization.

As a preferred specific example of the ferromagnetic powder, ferromagnetic hexagonal ferrite powder can be used. The ferromagnetic hexagonal ferrite powder can be ferromagnetic hexagonal barium ferrite powder, ferromagnetic hexagonal strontium ferrite powder, and the like. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

As a preferred specific example of the ferromagnetic powder, ε-iron oxide powder can also be used. As a method for producing ε-iron oxide powder, a method for producing ε-iron oxide powder from goethite and a reverse micelle method has been known. Both of the above-described production methods have been publicly known. Moreover, J. Jpn. Soc. Powder Metallurgy Vol. 61 Supplement, No. S1, pp. S280-S284 and J. Mater. Chem. C, 2013, 1, pp. 5200-5206 can be referred to about a method for producing ε-iron oxide powder where some of Fe are substituted with substitutional atoms such as Ga, Co, Ti, Al, and Rh, for example. The method for producing ε-iron oxide powder which can be used as ferromagnetic powder in the magnetic layer, however, is not limited to these methods.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic recording medium in order to measure the particle size, a method disclosed in paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder in the magnetic layer is preferably 50% to 90% by mass and more preferably 60% to 90% by mass. The component of the magnetic layer other than the ferromagnetic powder is at least a binding agent, or one or more kinds of additives can be randomly included. A high filling percentage of the ferromagnetic powder in the magnetic layer is preferable, from a viewpoint of improving recording density.

Binding Agent and Curing Agent

The magnetic recording medium is a coating type magnetic recording medium and includes a binding agent in the magnetic layer. The binding agent is one or more kinds of resin. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured under the following measurement conditions by gel permeation chromatography (GPC). The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent including an acidic group can be used. The acidic group of the invention and the specification is used as a meaning including a state of a group capable of emitting $H^+$ in water or a solvent including water (aqueous solvent) to dissociate anions and a salt thereof. Specific examples of the acidic group include a sulfonic acid group, a sulfate group, a carboxy group, a phosphate group, and a salt thereof. For example, salt of sulfonic acid group (—SO3H) is represented by —SO3M, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and a salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. eq indicates equivalent and SI unit is a unit not convertible. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass with respect to 100.0 parts by mass of the ferromagnetic powder.

In regards to the controlling of the isoelectric point of the surface zeta potential of the magnetic layer, the inventors have surmised that formation of the magnetic layer so that the amount of the acidic component present in the surface portion of the magnetic layer decreases contributes to an increase in value of the isoelectric point. In addition, the inventors have surmised that an increase in amount of the basic component present in the surface portion of the magnetic layer also contributes to an increase in value of the isoelectric point. The acidic component is used as a meaning including a state of a component capable of emitting $H^+$ in water or an aqueous solvent to dissociate anions and a salt thereof. The basic component is used as a meaning including a state of a component capable of emitting $OH^-$ in water or an aqueous solvent to dissociate cations and a salt thereof. For example, it is thought that, in a case of using the acidic component, performing a process of unevenly distributing the acidic component in a surface portion of a coating layer of a magnetic layer forming composition first, and then, performing a process of decreasing the amount of acidic component in the surface portion contribute to an increase in value of the isoelectric point of the surface zeta potential of the magnetic layer to control the isoelectric point to be equal to or greater than 5.5. For example, the inventors have thought that, in a step of applying a magnetic layer forming composition onto a non-magnetic support directly or through a non-magnetic layer, the applying which is performed in an alternating magnetic field by applying an alternating magnetic field contributes to uneven distribution of the acidic component in the surface portion of the coating layer of the magnetic layer forming composition. In addition, the inventors have surmised that a burnishing process performed subsequent thereto contributes to removal of at least some acidic component unevenly distributed. The burnishing process is a process of rubbing a surface of a process target with a member (for example, abrasive tape or a grinding tool such as a blade for grinding or a wheel for grinding). A magnetic layer forming step including the burnishing process will be described in detail. As the acidic component, for example, a binding agent including an acidic group can be used.

In addition, a curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. In a case where a composition used for forming the other layer includes the curing agent, this point also identically applies to the layer formed using this composition. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, a description disclosed in paragraphs 0030 to 0033, 0035, and 0036 of JP2016-126817A can be referred to. The lubricant may be included in the non-magnetic layer. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which can be included in the non-magnetic layer, a description disclosed in paragraph 0061 of JP2012-133837A can be referred to.

The magnetic layer described above can be provided on the surface of the non-magnetic support directly or indirectly through the non-magnetic layer.

Non-Magnetic Layer

Next, the non-magnetic layer will be described. The magnetic tape may directly include a magnetic layer on a non-magnetic support, or may include a non-magnetic layer including a non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic tape can also include a back coating layer including a non-magnetic powder and a binding agent on a surface of the non-magnetic support opposite to the surface including the magnetic layer. The back coating layer preferably includes any one or both of carbon black and inorganic powder. In regards to the binding agent included in the back coating layer and various additives which can be randomly included in the back coating layer, a well-known technology regarding the back coating layer can be applied, and a well-known technology regarding the treatment of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Magnetic Tape Total Thickness

A total thickness of the magnetic tape is equal to or smaller than 5.30 μm. It is preferable that the total thickness is small (thinning is realized), in order to increase recording capacity per one reel of a magnetic tape cartridge. The total thickness of the magnetic tape may be, for example, equal to or smaller than 5.20 μm, equal to or smaller than 5.10 μm, or equal to or smaller than 5.00 μm. In addition, from a viewpoint of ease of handling (handleability) of the magnetic tape, the total thickness of the magnetic tape is, for example, preferably equal to or greater than 1.00 μm, more preferably equal to or greater than 2.00 μm, even more preferably equal to or greater than 3.00 μm, and still more preferably equal to or greater than 4.00 μm.

Thickness of Non-Magnetic Support and Each Layer

The thickness of the non-magnetic support is preferably 3.00 to 4.50 μm. The thickness of the magnetic layer is preferably equal to or smaller than 0.15 μm and more preferably equal to or smaller than 0.10 μm, from a viewpoint of realizing recording at high density which is recently required. The thickness of the magnetic layer is more preferably 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.10 to 1.50 μm and preferably 0.10 to 1.00 μm.

A thickness of the back coating layer is preferably equal to or smaller than 0.90 μm and more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one random portion of the cross section, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Method

Manufacturing of Magnetic Tape in Which Servo Pattern is Formed

Each composition for forming the magnetic layer, the non-magnetic layer which is randomly provided, or the back coating layer normally includes a solvent, together with various components described above. As the solvent, various organic solvents generally used for manufacturing a coating type magnetic recording medium can be used. The amount of the solvent in each layer forming composition is not particularly limited, and can be set to be the same as that of each layer forming composition of a typical coating type magnetic recording medium. In addition, steps of preparing the composition for forming each layer generally include at least a kneading step, a dispersing step, or a mixing step provided before and after these steps, if necessary. Each step may be divided into two or more stages. All of raw materials used in the invention may be added at an initial stage or in a middle stage of each step. In addition, each raw material may be separately added in two or more steps.

In order to prepare each layer forming composition, a well-known technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-079274A (JP-H01-079274A). In addition, in order to disperse each layer forming composition, as a dispersion medium, at least one or more kinds of dispersion beads selected from the group consisting of glass beads and other dispersion beads can be used. As such dispersion beads, zirconia beads, titania beads, and steel beads which are dispersion beads having high specific gravity are suitable. These dispersion beads are preferably used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed by directly applying and drying the magnetic layer forming composition onto the surface of the non-magnetic support or performing multilayer coating with the non-magnetic layer forming composition in order or at the same time and drying. For details of the coating for forming each layer, a description disclosed in paragraph 0066 of JP2010-231843A can be referred to. In addition, the coating of the magnetic layer forming composition performed in an alternating magnetic field can contribute to the controlling of the isoelectric point of a surface zeta potential of the magnetic layer to be equal to or greater than 5.5. The inventors have surmised that this is because, an acidic component (for example, the binding agent including an acidic group) is easily unevenly distributed to a surface portion of a coating layer of the magnetic layer forming composition due to the applied alternating magnetic field, and thus, by drying this coating layer, a magnetic layer in which the acidic component is unevenly distributed to the surface portion is obtained. In addition, the inventors have surmised that the burnishing process performed subsequent thereto contributes to removal of at least some acidic component unevenly distributed to control the isoelectric point of a surface zeta potential of the magnetic layer to be equal to or greater than 5.5. However, this is merely a surmise. The applying of the alternating magnetic field can be performed by disposing a magnet in a coating device so that the alternating magnetic field is applied vertically to the surface of the coating layer of the magnetic layer forming composition. A magnetic field strength of the alternating magnetic field can be, for example, set as approximately 0.05 to 3.00 T. However, there is no limitation to this range. The "vertical" in the invention and the specification does not mean only a vertical direction in the strict sense, but also includes a range of errors allowed in the technical field of the invention. For example, the range of errors means a range of less than ±10° from an exact vertical direction.

The burnishing process is a process of rubbing a surface of a process target with a member (for example, abrasive tape or a grinding tool such as a blade for grinding or a wheel for grinding) and can be performed in the same manner as a well-known burnishing process for manufacturing a coating type magnetic recording medium. The burnishing process can be preferably performed by performing one or both of rubbing (polishing) of a surface of a coating layer of a process target with an abrasive tape, and rubbing (grinding) of a surface of a coating layer of a process target with a grinding tool. As the abrasive tape, a commercially available product may be used or an abrasive tape manufactured by a well-known method may be used. In addition, as the grinding tool, a well-known blade for grinding such as a fixed type blade, a diamond wheel, or a rotary blade, or a wheel for grinding can be used. Further, a wiping process of wiping the surface of the coating layer rubbed with the abrasive tape and/or the grinding tool with a wiping material may be performed. For details of the preferable abrasive tape, grinding tool, burnishing process, and wiping process, paragraphs 0034 to 0048, FIG. 1, and examples of JP1994-052544A (JP-H06-052544A) can be referred to. It is thought that, as the burnishing process is reinforced, it is possible remove a large amount of the acidic component unevenly distributed to the surface portion of the coating layer of the magnetic layer forming composition by performing the applying in the alternating magnetic field. As an abrasive having high hardness is used as an abrasive included in the abrasive tape, the burnishing process can be reinforced, and as the amount of the abrasive in the abrasive tape increases, the burnishing process can be reinforced. In addition, as a grinding tool having high hardness is used as the grinding tool, the burnishing process can be reinforced. In regards to burnishing process conditions, as a sliding speed of the surface of the coating layer of the process target and the member (for example, the abrasive tape or the grinding tool) increases, the burnishing process can be reinforced. The sliding speed can be increased by increasing one or both of a speed of movement of the member and a speed of movement of the magnetic tape of the process target. Although the reason is not clear, as the amount of the binding agent including the acidic group in the coating layer of the magnetic layer forming composition is great, the isoelectric point of a surface zeta potential of the magnetic layer tends to increase after the burnishing process.

In a case where the magnetic layer forming composition includes a curing agent, a curing process is preferably performed in any stage of the step for forming the magnetic layer. The burnishing process is preferably performed at least before the curing process. After the curing process, the burnishing process may be further performed. The inventors have thought that it is preferable to perform the burnishing process before the curing process, in order to increase removal efficiency for removing the acidic component from the surface portion of the coating layer of the magnetic layer forming composition. The curing process can be performed by a process of a heat treatment or light irradiation, according to the kind of the curing agent included in the magnetic layer forming composition. The curing process conditions are not particularly limited and may be suitably set according to the list of the magnetic layer forming composition, the kind of the curing agent, the thickness of the coating layer, and the like. For example, in a case where the coating layer is formed by using the magnetic layer forming composition including polyisocyanate as the curing agent, the curing process is preferably a heat treatment. In a case where the curing agent is included in a layer other than the coating layer of the magnetic layer forming composition, the curing process can proceed with the curing reaction of the layer. Alternatively, the curing process can also be performed separately.

The surface smoothing treatment can be preferably performed before the curing process. The surface smoothing treatment is a process performed for increasing smoothness of the surface of the magnetic layer and/or the surface of the back coating layer and is preferably performed by a calender process. For details of the calender process, description disclosed in paragraph 0026 of JP2010-231843A can be referred to, for example.

For various other steps for manufacturing the magnetic tape in which the servo pattern is formed, a well-known technology can be applied. For details of the various steps, descriptions disclosed in paragraphs 0067 to 0070 of JP2010-231843A can be referred to, for example.

Formation of Servo Pattern

The magnetic tape has a servo pattern in the magnetic layer. Details of the servo pattern is as described above. For example, FIG. 1 shows an example of disposition of a region (servo band) in which the timing-based servo pattern is formed and a region (data band) interposed between two servo bands. FIG. 2 shows an example of disposition of the timing-based servo patterns. Here, the example of disposition shown in each drawing is merely an example, and the servo pattern, the servo bands, and the data bands may be formed and disposed in the disposition according to a system of the magnetic tape device (drive). In addition, for the shape and the disposition of the timing-based servo pattern, a well-known technology such as examples of disposition shown in FIG. 4, FIG. 5, FIG. 6, FIG. 9, FIG. 17, and FIG. 20 of U.S. Pat. No. 5,689,384A can be applied, for example.

The servo pattern can be formed by magnetizing a specific region of the magnetic layer by a servo write head mounted on a servo writer. In the timing-based servo system, for example, the servo patterns are configured of consecutive alignment of a plurality of pairs of servo patterns (also referred to as "servo stripes"), in each pair of which servo stripes are not parallel with each other, in the longitudinal direction of the magnetic tape. The servo element can read the servo stripes to yield a servo signal.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

The servo write head has the same number of pairs of gaps corresponding to the respective pairs of magnetic stripes as the number of servo bands. Generally, a core and a coil are connected to each pair of gaps, and a magnetic field generated in the core by supplying a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 µm or less, 1 to 10 µm, or 10 µm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

The magnetic tape is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce information (magnetic signals) to the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of the magnetic signal is performed. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

The magnetic tape according to one aspect of the invention described above is a magnetic tape in which a total thickness is decreased to be equal to or smaller than 5.30 µm, has high surface smoothness with the magnetic layer surface roughness Ra equal to or smaller than 1.8 nm, and can prevent the generation of a signal defect during the servo signal reproduction in the servo system.

Magnetic Tape Device

One aspect of the invention relates to a magnetic tape device including the magnetic tape, a magnetic head, and a servo head.

The details of the magnetic tape mounted on the magnetic tape device are as described above. Such a magnetic tape includes servo patterns. Accordingly, a magnetic signal is recorded on the data band by the magnetic head to form a data track, and/or, in a case of reproducing the recorded signal, head tracking is performed based on the read servo pattern, while reading the servo pattern by the servo head, and therefore, it is possible to cause the magnetic head to follow the data track at a high accuracy.

As the magnetic head mounted on the magnetic tape device, a well-known magnetic head which can perform the recording and/or reproducing of the magnetic signal with respect to the magnetic tape can be used. A recording head and a reproduction head may be one magnetic head or may be separated magnetic heads. As the servo head, a well-known servo head which can read the timing-based servo pattern of the magnetic tape can be used. At least one or two or more servo heads may be included in the magnetic tape device. In addition, a servo pattern reading element may be included in a magnetic head including an element for recording a magnetic signal and/or an element for the reproducing. That is, the magnetic head and the servo head may be a single head.

For details of the head tracking servo of the timing-based servo system, for example, well-known technologies such as technologies disclosed in U.S. Pat. Nos. 5,689,384A, 6,542,325B, and 7,876,521B can be used. In addition, for the details of the head tracking servo in the amplitude-based servo system, well-known technologies disclosed in U.S. Pat. Nos. 5,426,543A and 5,898,533A can be used.

A commercially available magnetic tape device generally includes a magnetic head and a servo head in accordance with a standard. In addition, a commercially available magnetic tape device generally has a servo controlling mechanism for realizing head tracking of the servo system in accordance with a standard. The magnetic tape device according to one aspect of the invention can be configured by incorporating the magnetic tape according to one aspect of the invention to a commercially available magnetic tape device.

EXAMPLES

Hereinafter, the invention will be described with reference to examples. However, the invention is not limited to aspects shown in the examples. "Parts" and "%" in the following description are based on mass, unless otherwise noted.

A "binding agent A" described below is a $SO_3Na$ group-containing polyurethane resin (weight-average molecular weight: 70,000, $SO_3Na$ group: 0.20 meq/g).

A "binding agent B" described below is a vinyl chloride copolymer (product name: MR110, $SO_3K$ group-containing vinyl chloride copolymer, $SO_3K$ group: 0.07 meq/g) manufactured by Kaneka Corporation.

Manufacturing of Magnetic Tape

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Liquid
Ferromagnetic powder: 100.0 parts
Ferromagnetic hexagonal barium ferrite powder having average particle size (average plate diameter) of 21 nm
Binding agent (see Table 1): see Table 1
Cyclohexanone: 150.0 parts
Methyl ethyl ketone: 150.0 parts
Abrasive Solution
Alumina dispersion prepared in the section (1): 6.0 parts
Silica Sol (projection forming agent liquid)
Colloidal silica (Average particle size: 120 nm) 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) manufactured by Tosoh Corporation): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
Binding agent A: 18.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Non-magnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
A vinyl chloride copolymer: 13.0 parts
Sulfonic acid group-containing polyurethane resin: 6.0 parts
Phenylphosphonic acid: 3.0 parts
Methyl ethyl ketone: 155.0 parts
Polyisocyanate: 5.0 parts
Cyclohexanone: 355.0 parts
(5) Preparation of Each Layer Forming Composition
The magnetic layer forming composition was prepared by the following method.

The magnetic liquid was prepared by dispersing (beads-dispersing) each component by using a batch type vertical sand mill for 24 hours. Zirconia beads having a bead diameter of 0.5 mm were used as the dispersion beads.

The prepared magnetic liquid and abrasive solution, and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method.

Each component excluding the lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

The back coating layer forming composition was prepared by the following method.

Each component excluding polyisocyanate and cyclohexanone was kneaded by an open kneader and diluted, and was subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1 μm and a back coating layer forming composition was prepared.

(6) Manufacturing Method of Magnetic Tape

The non-magnetic layer forming composition prepared in the section (5) was applied to a surface of a support made of polyethylene naphthalate having a thickness shown in Table 1 so that the thickness after the drying becomes a thickness shown in Table 1 and was dried to form a non-magnetic layer.

Then, in a coating device disposed with a magnet for applying an alternating magnetic field, the magnetic layer forming composition prepared in the section (5) was applied onto the surface of the non-magnetic layer so that the thickness after the drying becomes a thickness shown in Table 1, while applying an alternating magnetic field (magnetic field strength: 0.15 T), to form a coating layer. The applying of the alternating magnetic field was performed so that the alternating magnetic field was applied vertically to the surface of the coating layer. After that, a homeotropic alignment process was performed by applying a magnetic field having a magnetic field strength of 0.30 T in a vertical direction with respect to a surface of a coating layer, while the coating layer of the magnetic layer forming composition is wet (not dried). After that, the coating layer was dried to form a magnetic layer.

After that, the back coating layer forming composition prepared in the section (5) was applied to the surface of the support made of polyethylene naphthalate on a side opposite to the surface where the non-magnetic layer and the magnetic layer were formed, so that the thickness after the drying becomes a thickness shown in Table 1, and was dried to form a back coating layer.

The magnetic tape obtained as described above was slit to have a width of ½ inches (0.0127 meters), and the burnishing process and the wiping process of the surface of the coating layer of the magnetic layer forming composition were performed. The burnishing process and the wiping process were performed in a process device having a configuration shown in FIG. 1 of JP1994-052544A (JP-H06-052544A), by using a commercially available abrasive tape (product name: MA22000 manufactured by Fujifilm Holdings Corporation, abrasive: diamond/$Cr_2O_3$/red oxide) as an abrasive tape, by using a commercially available sapphire diamond (manufactured by Kyocera Corporation, width of 5 mm, length of 35 mm, an angle of a distal end of 60 degrees) as a blade for grinding, and by using a commercially available wiping material (product name: WRP736 manufactured by Kuraray Co., Ltd.) as a wiping material. For the process conditions, process conditions of Example 12 of JP1994-052544A (JP-H06-052544A) were used.

After the burnishing process and the wiping process, a calender process (surface smoothing treatment) was performed by using a calender roll configured of only a metal roll, at a speed of 80 m/min, linear pressure of 300 kg/cm (294 kN/m), and a calender temperature (surface temperature of a calender roll) shown in Table 1.

Then, the heat treatment (curing process) was performed in the environment of the atmosphere temperature of 70° C. for 36 hours. After that, a servo pattern (timing-based servo pattern) was formed on the magnetic layer by a commercially available servo writer.

By doing so, a magnetic tape of Example 1 was manufactured.

Examples 2 to 6, Comparative Examples 1 to 8, and Reference Examples 1 to 4

A magnetic tape was manufactured by the same method as in Example, except that various conditions were changed as shown in Table 1.

In Table 1, in Examples 2 to 6 in which "performed" is shown in the column of the alternating magnetic field application during coating and the column of the burnishing process, the step subsequent to the coating step of the magnetic layer forming composition was performed by the same method as in Example 1. That is, the application of the alternating magnetic field was performed during coating of the magnetic layer forming composition in the same manner as in Example 1, and the burnishing process and the wiping process were performed with respect to the coating layer of the magnetic layer forming composition.

With respect to this, in Comparative Example 7 in which "not performed" is shown in the column of the burnishing process, the step subsequent to the coating step of the magnetic layer forming composition was performed by the same method as in Example 1, except that the burnishing process and the wiping process were not performed with respect to the coating layer of the magnetic layer forming composition.

In Comparative Example 8 in which "not performed" is shown in the column of the alternating magnetic field application during coating, the step subsequent to the coating step of the magnetic layer forming composition was performed by the same method as in Example 1, except that the application of the alternating magnetic field was not performed.

In Comparative Examples 1 to 6 and Reference Examples 1 to 4 in which "not performed" is shown in the column of the alternating magnetic field application during coating and the column of the burnishing process, the step subsequent to the coating step of the magnetic layer forming composition was performed by the same method as in Example 1, except that application of the alternating magnetic field is not performed and the burnishing process and the wiping process were not performed with respect to the coating layer of the magnetic layer forming composition.

The thickness of each layer and the thickness of the non-magnetic support of each magnetic tape of the examples, the comparative examples, and the reference examples were acquired by the following method, and it was confirmed that the thicknesses obtained were thicknesses shown in Table 1.

A cross section of the magnetic tape in a thickness direction was exposed to ion beams and the exposed cross section was observed with a scanning electron microscope. Various thicknesses were obtained as an arithmetical mean of thicknesses obtained at two portions, randomly extracted from the cross section observation.

Evaluation of Magnetic Tape (1) Isoelectric Point of Surface Zeta Potential of Magnetic Layer Six samples for isoelectric point measurement were cut out from each magnetic tape of the examples, the comparative examples, and the reference examples and disposed in the measurement cell of two samples in one measurement. In the measurement cell, a sample installing surface and a surface of the back coating layer of the sample were bonded to each other by using a double-sided tape in upper and lower sample table (size of each sample installing surface is 1 cm×2 cm) of the measurement cell. Accordingly, in a case where an electrolyte flows in the measurement cell, the surface of the magnetic layer of the sample comes into contact with the electrolyte, and thus, the surface zeta potential of the magnetic layer can be measured. The measurement was performed three times in total by using two samples in each measurement, and the isoelectric points of the surface zeta potential of the magnetic layer were obtained. An arithmetical mean of the obtained three values was shown in Table 1, as the isoelectric point of the surface zeta potential of the magnetic layer of each magnetic tape. As a surface zeta potential measurement device, SurPASS manufactured by Anton Paar was used. The measurement conditions were set as follows. Other details of the method of obtaining the isoelectric point are as described above.

Measurement cell: variable gap cell (20 mm×10 mm)
Measurement mode: Streaming Current
Gap: approximately 200 μm
Measurement temperature: room temperature
Ramp Target Pressure/Time: 400,000 Pa (400 mbar)/60 seconds
Electrolyte: KCl aqueous solution having concentration of 1 mmol/L (adjusted pH to 9)
pH adjusting solution: HCl aqueous solution having concentration of 0.1 mol/L or KOH aqueous solution having concentration of 0.1 mol/L
Measurement pH: pH 9→pH 3 (measured at 13 measurement points in total at interval of approximately 0.5)

(2) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 μm/sec, and a resolution was set as 512 pixel×512 pixel.

(3) Generation Frequency of Signal Defect (Thermal Asperity) During Servo Signal Reproduction The magnetic tape in which the servo pattern was formed was attached to a servo tester. In this servo tester, the magnetic tape was caused to run, and the surface of the magnetic layer of the running magnetic tape was brought into contact with the servo head in which the MR element was mounted, and slid, and therefore, the servo pattern was read (servo signal was reproduced) by the servo head. In the reproduced waveform of the servo signal obtained by the reproduction, a portion which is not a normal burst signal and showing an output of 200% or more, in a case where an average value of the output of the noise level was set as 100%, was determined as a thermal asperity, and the number of times of the generation of the thermal asperity was counted. A value obtained by dividing the counted number of times of the generation of the thermal asperity by a total length of the magnetic tape (number/m) was set as thermal asperity generation frequency.

The results of the above calculation are shown in Table 1 (Table 1-1 to Table 1-4).

TABLE 1-1

| | | Example 1 | Example 2 | Example 3 | Example 4 | Example 5 | Example 6 |
|---|---|---|---|---|---|---|---|
| Magnetic layer thickness (μm) | | 0.10 | 0.10 | 0.10 | 0.10 | 0.10 | 0.10 |
| Non-magnetic layer thickness (μm) | | 0.70 | 0.70 | 0.70 | 0.70 | 0.70 | 0.50 |
| Non-magnetic support thickness (μm) | | 4.20 | 4.20 | 4.20 | 4.20 | 4.20 | 4.00 |
| Back coating layer thickness (μm) | | 0.30 | 0.30 | 0.30 | 0.30 | 0.30 | 0.30 |
| Magnetic tape total thickness (μm) | | 5.30 | 5.30 | 5.30 | 5.30 | 5.30 | 4.90 |
| Formation of magnetic layer | Content of binding agent A in magnetic liquid | 5.0 parts | 10.0 parts | 15.0 parts | 20.0 parts | 10.0 parts | 10.0 parts |
| | Content of binding agent B in magnetic liquid | 0 parts | 0 parts | 0 parts | 0 parts | 10.0 parts | 0 parts |
| | Alternating magnetic field application during coating | Performed | Performed | Performed | Performed | Performed | Performed |
| | Burnishing process | Performed | Performed | Performed | Performed | Performed | Performed |
| Calender temperature (° C.) | | 100 | 100 | 100 | 100 | 100 | 105 |
| Magnetic layer surface roughness Ra (nm) | | 1.8 | 1.8 | 1.8 | 1.8 | 1.8 | 1.6 |
| Isoelectric point of surface zeta potential of magnetic layer | | 5.5 | 6.0 | 6.3 | 6.5 | 6.3 | 6.0 |
| Signal defect (thermal asperity) Generation frequency (number/m) | | 0.20 | 0.10 | 0.08 | 0.05 | 0.05 | 0.11 |

TABLE 1-2

| | | Comparative Example 1 | Comparative Example 2 | Comparative Example 3 | Comparative Example 4 |
|---|---|---|---|---|---|
| Magnetic layer thickness (μm) | | 0.10 | 0.10 | 0.10 | 0.10 |
| Non-magnetic layer thickness (μm) | | 0.70 | 0.50 | 0.70 | 0.50 |
| Non-magnetic support thickness (μm) | | 4.20 | 4.00 | 4.20 | 4.00 |
| Back coating layer thickness (μm) | | 0.30 | 0.30 | 0.30 | 0.30 |
| Magnetic tape total thickness (μm) | | 5.30 | 4.90 | 5.30 | 4.90 |
| Formation of magnetic layer | Content of binding agent A in magnetic liquid | 10.0 parts | 10.0 parts | 10.0 parts | 10.0 parts |
| | Content of binding agent B in magnetic liquid | 0 parts | 0 parts | 0 parts | 0 parts |
| | Alternating magnetic field application during coating | Not performed | Not performed | Not performed | Not performed |
| | Burnishing process | Not performed | Not performed | Not performed | Not performed |

TABLE 1-2-continued

|  | Comparative Example 1 | Comparative Example 2 | Comparative Example 3 | Comparative Example 4 |
| --- | --- | --- | --- | --- |
| Calender temperature (° C.) | 100 | 100 | 105 | 105 |
| Magnetic layer surface roughness Ra (nm) | 1.8 | 1.8 | 1.6 | 1.6 |
| Isoelectric point of surface zeta potential of magnetic layer | 4.7 | 4.8 | 4.8 | 4.8 |
| Signal defect (thermal asperity) Generation frequency (number/m) | 1.00 | 1.40 | 5.00 | 7.50 |

TABLE 1-3

|  |  | Comparative Example 5 | Comparative Example 6 | Comparative Example 7 | Comparative Example 8 |
| --- | --- | --- | --- | --- | --- |
| Magnetic layer thickness (μm) | | 0.10 | 0.10 | 0.10 | 0.10 |
| Non-magnetic layer thickness (μm) | | 0.70 | 0.70 | 0.70 | 0.70 |
| Non-magnetic support thickness (μm) | | 4.20 | 4.20 | 4.20 | 4.20 |
| Back coating layer thickness (μm) | | 0.30 | 0.30 | 0.30 | 0.30 |
| Magnetic tape total thickness (μm) | | 5.30 | 5.30 | 5.30 | 5.30 |
| Formation of magnetic layer | Content of binding agent A in magnetic liquid | 5.0 parts | 20.0 parts | 10.0 parts | 10.0 parts |
| | Content of binding agent B in magnetic liquid | 0 parts | 0 parts | 0 parts | 0 parts |
| | Alternating magnetic field application during coating | Not performed | Not performed | Performed | Not performed |
| | Burnishing process | Not performed | Not performed | Not performed | Perforated |
| Calender temperature (° C.) | | 100 | 100 | 100 | 100 |
| Magnetic layer surface roughness Ra (nm) | | 1.8 | 1.8 | 1.8 | 1.8 |
| Isoelectric point of surface zeta potential of magnetic layer | | 5.2 | 4.3 | 4.2 | 4.2 |
| Signal defect (thermal asperity) Generation frequency (number/m) | | 8.00 | 10.00 | 10.00 | 10.00 |

TABLE 1-4

|  |  | Reference Example 1 | Reference Example 2 | Reference Example 3 | Reference Example 4 |
| --- | --- | --- | --- | --- | --- |
| Magnetic layer thickness (μm) | | 0.10 | 0.10 | 0.10 | 0.10 |
| Non-magnetic layer thickness (μm) | | 1.00 | 0.70 | 0.70 | 0.50 |
| Non-magnetic support thickness (μm) | | 4.30 | 4.20 | 4.20 | 4.00 |
| Back coating layer thickness (μm) | | 0.60 | 0.40 | 0.30 | 0.30 |
| Magnetic tape total thickness (μm) | | 6.00 | 5.40 | 5.30 | 4.90 |
| Formation of magnetic layer | Content of binding agent A in magnetic liquid | 10.0 parts | 10.0 parts | 10.0 parts | 10.0 parts |
| | Content of binding agent B in magnetic liquid | 0 parts | 0 parts | 0 parts | 0 parts |
| | Alternating magnetic field application during coating | Not performed | Not performed | Not performed | Not performed |
| | Burnishing process | Not performed | Not performed | Not performed | Not performed |
| Calender temperature (° C.) | | 100 | 100 | 90 | 90 |
| Magnetic layer surface roughness Ra (nm) | | 1.8 | 1.8 | 2.2 | 2.2 |
| Isoelectric point of surface zeta potential of magnetic layer | | 4.8 | 4.8 | 4.8 | 4.8 |
| Signal defect (thermal asperity) Generation frequency (number/m) | | 0.09 | 0.10 | 0.05 | 0.10 |

With the comparison of Reference Examples 1 to 4 and Comparative Examples 1 to 8, it was confirmed that the generation frequency of the signal defect during the servo signal reproduction significantly increases, in a case where the magnetic tape total thickness is equal to or smaller than 5.30 μm and the magnetic layer surface roughness Ra is equal to or smaller than 1.8 nm (Comparative Examples 1 to 6), compared to a case where the magnetic tape total thickness is greater than 5.30 μm (Reference Examples 1 and 2) and a case where the magnetic layer surface roughness Ra is greater than 1.8 nm (Reference Examples 3 and 4).

With respect to this, although the magnetic tape of Examples 1 to 6 has the total thickness equal to or smaller than 5.30 μm and the magnetic layer surface roughness Ra equal to or smaller than 1.8 nm, the generation frequency of the signal defect during the servo signal reproduction was significantly decreased, compared to that of the magnetic tapes of Comparative Examples 1 to 8.

One aspect of the invention is effective in technical fields of magnetic tapes for high-density recording.

What is claimed is:

1. A magnetic tape comprising:
   a non-magnetic support; and
   a magnetic layer including a ferromagnetic powder on the non-magnetic support,
   wherein a thickness of the non-magnetic support is 3.00 to 4.50 μm,
   the magnetic layer has a servo pattern,
   a center line average surface roughness Ra measured regarding a surface of the magnetic layer is equal to or smaller than 1.8 nm, and
   an isoelectric point of a surface zeta potential of the magnetic layer is equal to or greater than 5.5.

2. The magnetic tape according to claim 1,
   wherein the isoelectric point is 5.5 to 7.0.

3. The magnetic tape according to claim 1,
   wherein the magnetic layer includes a binding agent including an acidic group.

4. The magnetic tape according to claim 3,
   wherein the acidic group includes at least one kind of acidic group selected from the group consisting of a sulfonic acid group and a salt thereof.

5. The magnetic tape according to claim 1,
   wherein the center line average surface roughness Ra measured regarding the surface of the magnetic layer is 1.2 nm to 1.8 nm.

6. The magnetic tape according to claim 1, further comprising:
   a non-magnetic layer including a non-magnetic powder between the non-magnetic support and the magnetic layer.

7. The magnetic tape according to claim 1, further comprising:
   a back coating layer including a non-magnetic powder on a surface of the non-magnetic support opposite to a surface provided with the magnetic layer.

8. A magnetic tape device comprising:
   the magnetic tape according to claim 1;
   a magnetic head; and
   a servo head.

* * * * *